(12) United States Patent
Al-Amri

(10) Patent No.: US 9,958,072 B2
(45) Date of Patent: May 1, 2018

(54) LINE BLIND VALVE ASSEMBLY HAVING AN INJECTION SEALING SYSTEM

(71) Applicant: Saudi Arabian Oil Company, Dhahran (SA)

(72) Inventor: Omar M. Al-Amri, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 161 days.

(21) Appl. No.: 14/812,382

(22) Filed: Jul. 29, 2015

(65) Prior Publication Data

US 2017/0030470 A1    Feb. 2, 2017

(51) Int. Cl.
*F16K 3/02* (2006.01)
*F16K 3/06* (2006.01)
*F16K 3/312* (2006.01)

(52) U.S. Cl.
CPC ............ *F16K 3/0227* (2013.01); *F16K 3/06* (2013.01); *F16K 3/312* (2013.01)

(58) Field of Classification Search
CPC .......... F16K 3/0227; F16K 3/06; F16K 3/312
USPC ................................ 137/246; 251/302, 355
See application file for complete search history.

(56) References Cited

U.S. PATENT DOCUMENTS

| | | | |
|---|---|---|---|
| 2,462,493 A * | 2/1949 | Hamer | F16K 3/312 138/44 |
| 2,462,494 A | 2/1949 | Hamer | |
| 2,865,393 A | 12/1958 | Edge et al. | |
| 2,889,853 A | 6/1959 | Dryer | |
| 3,215,157 A | 11/1965 | Anderson | |
| 4,067,542 A | 1/1978 | Morrison | |
| 4,209,029 A | 6/1980 | Pennington | |
| 4,452,278 A | 6/1984 | Quinn | |
| 4,478,251 A | 10/1984 | Sanchez et al. | |
| 4,519,582 A | 5/1985 | Freeman | |
| 5,076,311 A | 12/1991 | Marschke | |

(Continued)

FOREIGN PATENT DOCUMENTS

GB            995457           6/1965

OTHER PUBLICATIONS

International Search Report and Written Opinion for related PCT application PCT/US2016/044402 dated Oct. 14, 2016.

*Primary Examiner* — Kevin Murphy
*Assistant Examiner* — Patrick Williams
(74) *Attorney, Agent, or Firm* — Bracewell LLP; Constance G. Rhebergen; Keith R. Derrington

(57) ABSTRACT

A blind assembly for use in a piping circuit that includes a blind element and an injection system. The blind element has a planar portion that is transversely mounted in the piping circuit to block flow through the piping circuit. When the blind element is installed, it has one or more flat surfaces that are in sealing contact with another component of the piping circuit, such as a flange face, to define a sealing interface. A primary seal is provided between the blind element and the other component of the piping circuit and which circumscribes at least a portion of the sealing interface. The injection system is in communication with the sealing interface, and selectively injects a sealant material into the sealing interface to form a redundant seal in the sealing interface and around the primary seal. An injection fitting can mount to the flange for injecting the sealant.

20 Claims, 4 Drawing Sheets

(56) References Cited

U.S. PATENT DOCUMENTS

| | | | |
|---|---|---|---|
| 5,464,036 A * | 11/1995 | Tomkins | ............ G01F 1/42 |
| | | | 137/315.42 |
| 5,582,211 A | 12/1996 | Monson | |
| 6,085,793 A | 7/2000 | Mayhew | |
| 6,691,733 B1 | 2/2004 | Morris | |
| 7,398,675 B1 | 7/2008 | Metzger et al. | |

* cited by examiner

LINE BLIND VALVE ASSEMBLY HAVING AN INJECTION SEALING SYSTEM

BACKGROUND OF THE INVENTION

1. Field of Invention

The present disclosure relates in general to a redundantly sealing a line blind valve. More specifically, the present disclosure relates to a line blind valve with a redundant seal ring formed by injection of a sealant.

2. Description of Related Art

Fluids handling circuits in use in industrial facilities for transmitting fluids typically include lengths of piping and various pieces of fluids handling equipment, where the piping interconnects between the various pieces of the fluids handling equipment. The fluids handling equipment can range from multistory fractionation towers, storage tanks, pumps, compressors, and drums to much smaller items, such as specialty piping equipment, e.g. steam traps, strainers, and filters. What hardware is taken out of service depends on the specific situation, but the particularly hardware actually taken out of service can include a single component within a piping circuit, two or more components in the piping circuit, a section of the length of piping, or an entire circuit. The out of service time period can be as short as a few hours, can be months, or can be permanent. While out of service, the specific portion of a piping circuit is generally isolated from the rest of the piping circuit. Fluid within the out of service piping circuit is typically drained or vented from within the equipment. If required, personnel can safely perform maintenance on, or repair of, the hardware after the fluid has been removed.

Usually included within most piping circuits are valves that can block or isolate portions of the piping circuit being isolated. These valves are sometimes also utilized to isolate the portion of the piping circuit being taken out of service. However, out of service isolation using valves is typically only done when the out of service time period is relatively short, i.e. less than a day. More typically, blinds, such as line blind valves, are used for isolating all or portions of a piping circuit. Blinds, which are usually planar members, have a solid portion that are transversely installed in a pipe and that block fluid communication through the pipe. Blind valve assemblies typically include a blind that can be swung between open and closed positions through different mechanisms that basically force the joint to relax and hence, allow blind to be swung. An O-ring seal is usually provided on the mating surfaces of the blind within the line blind valves and the flanges for preventing fluid from escaping across the blind to ambient. The O-ring seals though can become damaged, either over time or mechanically while being installed, thereby forming a leak path for fluid within a live portion of the piping circuit.

SUMMARY OF THE INVENTION

Disclosed herein are examples of a blind valve assembly for use in a fluids handling circuit. In an embodiment the fluids handling circuit a flange mounted on an end of a tubular, and where the line blind valve assembly has a blind element with a planar surface in communication with an inside of the tubular and that has an outer periphery in sealing contact with the flange to define a sealing interface. The blind valve assembly also includes a seal provided along the circumference of the sealing interface and that defines a pressure barrier along a radial path, a recess on the planar surface along the sealing interface and that circumscribes the seal, and a sealant injection system in communication with the recess, so that when sealant is injected into the recess, a redundant seal is provided along the recess and that circumscribes the seal. The blind valve assembly can further include a passage through the flange that has an end in communication with the recess, and an opposite end in selective communication with the sealant injection system. In this example, the sealant injection system includes a sealant source that injects sealant into the passage; and can further include a fitting threaded into the passage for connecting to a line from the sealant source. In an alternative, the blind element includes a spectacle blind, having a substantially disk like planar blank portion, and a planar ring like spectacle portion that is coplanar and attached to the blank portion, and wherein both the blank portion and spectacle portion each have a sealing interface in selective sealing contact with the flange. In one example, the planar surface makes up a first surface and the flange makes up a first flange, the blind element can further include a second surface that is on a side opposite the first surface and that is in sealing contact with a second flange that is coupled to the first flange. In an embodiment, the tubular is a fluids handling element, such as a fluid flow line and a nipple connected to a vessel. In one alternative, the seal is an O-ring seal.

One example of a fluids handling circuit is disclosed herein and that includes a tubular, a flange mounted to an end of the tubular, a blind element having a planar surface with an inner portion that is in communication with an inside of the tubular and that has an outer portion in sealing contact with the flange to define a sealing interface, a seal element disposed along the sealing interface and that circumscribes the inner portion and that defines an inner seal, a recess formed in one of the flange or the outer portion that circumscribes the seal element, and a passage formed through the flange having an end in communication with the recess and an opposite end in selective communication with a source of sealant, so that when sealant is provided by the source of sealant to the passage, a redundant seal is formed along the recess that defines an outer seal to block pressure communication along a radial path between the blind element and flange. The fluids handling circuit can further include a sealant injection system for injecting sealant from the source of sealant into the passage. A fitting can be included at an end of the passage on which an injection line that is part of the sealant injection system is attached. In one example, the tubular is a fluids handling element such as a fluid flow line or a nipple that attaches to a vessel. The blind element can further include a spectacle blind portion that is planar and has a mid-portion with an opening through the mid-portion, and an outer portion that circumscribes the mid-portion and that is in selective sealing contact with the flange to define a sealing interface. In one alternative, the planar surface is a first surface and the flange is a first flange, the seal element is a first seal element, the redundant seal is a first redundant seal, and wherein the blind element further includes a second surface that is planar and on a side opposite the first surface, and that is in sealing contact with a second flange by a second seal element that is circumscribed by a second redundant seal that comprises sealant selectively disposed in a recess formed on the second planar surface.

Also disclosed herein is a method of forming a blind in a fluids handling circuit, and which includes providing a blind element having a planar surface with a seal element and a groove that circumscribes the seal element, mounting the blind element to a flange that connects to an end of a fluids handling tubular so that the seal element is in sealing contact with the flange to define a sealing interface, and injecting a sealant into the groove to form a redundant seal that blocks pressure communication along a radial path between the flange and the blind element. In one embodiment, a passage is formed through the flange. Further optionally, a sealant injection system can connect to the passage and inject sealant into the passage. In one example, the planar surface is a first surface, the flange is a first flange, and wherein the blind element has a second surface that is planar and opposite the first surface; in this example, the method further includes mounting the blind element to a second flange so that the second surface is in sealing contact with the second flange. In this example, the groove is a first groove, the redundant seal is a first redundant seal, and the seal element includes a second seal element, and wherein the second surface is a second groove in which sealant is injected to form a second redundant seal that circumscribes the second seal element. In an example, the fluids handling tubular can be a fluid flow line or a nipple that attaches to a vessel.

BRIEF DESCRIPTION OF DRAWINGS

Some of the features and benefits of the present invention having been stated, others will become apparent as the description proceeds when taken in conjunction with the accompanying drawings, in which.

Figure 1:
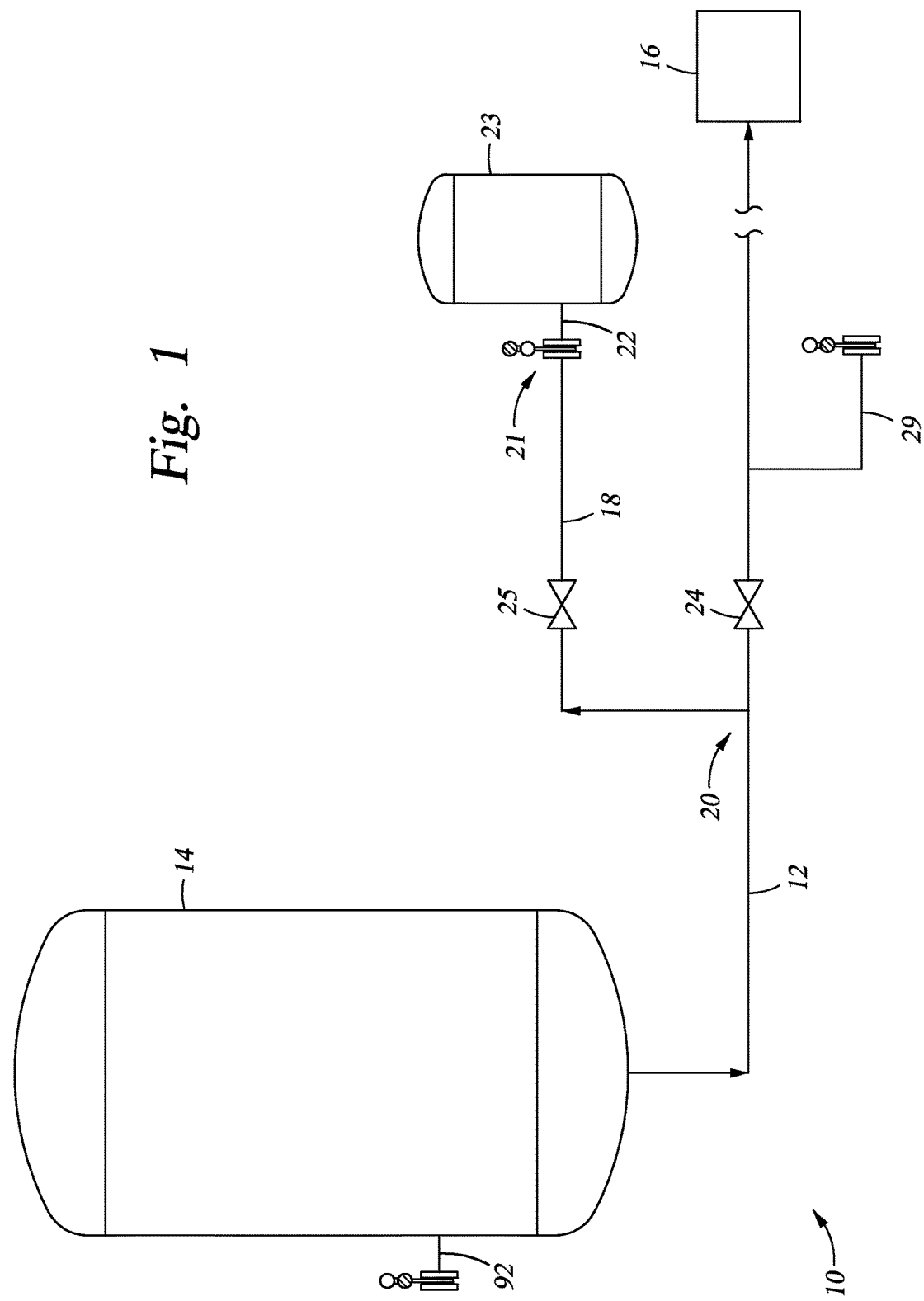
FIG. 1 is a schematic view of an example of a piping circuit having a line blind valve assembly.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

FIG. 1 is a schematic example of a fluids handling circuit 10 shown including a line 12, which in the illustrated example is a fluid flow line for transmitting fluid from a supply vessel 14 to a terminal point 16. Terminal point 16 can be another vessel, a pump suction, a battery limit, or any other type of fluids handling equipment that is at a location different from supply vessel 14. Line 18, which also is a fluid flow line for transporting a fluid, branches from line 12 at branch-T 20 and terminates at a blind valve assembly 21. Line 22 is shown mounted to the downstream end of line blind valve assembly 21; at an end distal from line blind valve assembly 21, line 22 terminates at a discharge vessel 23 thereby completing communication between supply vessel 14 and discharge vessel 23. A passage P (FIG. 2) is formed within lines 18, 22. Block valves 24, 25 are shown respectively in lines 12 and line 18, and wherein block valve 24 is downstream of branch-T 20. Selectively opening and closing block valves 24, 25 can be used for regulating flow through line 12 and 18, and thus flow to one or both of terminal point 16 and discharge vessel 23. As will be described in more detail below, line blind valve assembly 21 can be used to block flow communication through line 18, and thus along passage P, for prolonged periods of time. In the illustrated example, line blind valve assembly 21 is schematically illustrated as a spectacle blind, and in the open position, thereby allowing flow through line 18. As is known, line blind valve assembly 21 can be adjusted so that flow communication through line 18 is selectively blocked.

Figure 2:
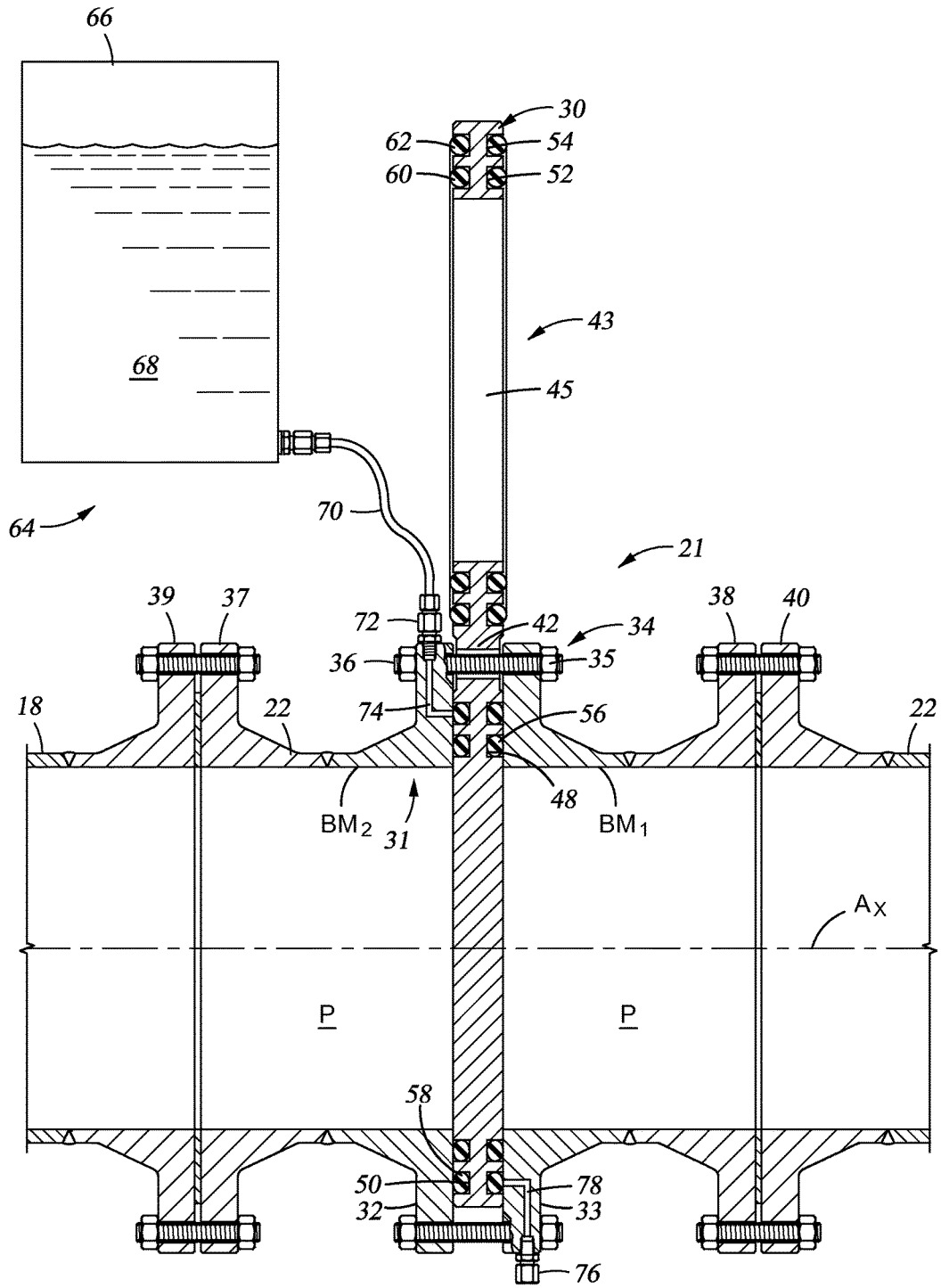
FIG. 2 is a side sectional view of an example of the line blind valve assembly of FIG. 1.

FIG. 2 shows in a side partial sectional view details of an embodiment of line blind valve assembly 21, and which includes a blind element 30 mounted in a body 31 of the line blind valve assembly 21. In the example of FIG. 2, the body 31 includes a pair of annular body members $BM_1$, $BM_2$; inner flanges 32, 33 are formed respectively on annular body members $BM_1$, $BM_2$. As shown in the illustrated example, inner flanges 32, 33 are coaxially coupled to one another thereby affixing together annular body members $BM_1$, $BM_2$. Further illustrated is that the blind element 30 is coaxially mounted between flanges 32, 33. Fasteners 34, shown as a combination of nuts 35 and bolts 36, are used for fastening together the flanges 32, 33 in a coaxial fashion. When fastened between flanges 32, 33, blind element 30 and flanges 32, 33 are in sealing contact to prevent fluid within lines 18, 22 from escaping between flanges 32, 33 and opposing planar surfaces of the blind element 30. As illustrated, blind element 30 is put into a blocking configuration thereby blocking fluid communication across flanges 32, 33. Flanges 37, 38 are shown respectively on the ends of annular body members $BM_1$, $BM_2$ distal from flanges 32, 33. Flanges 37, 38 respectively couple to flanges 39, 40 shown on ends of lines 18, 22 adjacent the line blind valve assembly 21; thereby affixing the line blind valve assembly 21 to the lines 18, 22.

Figure 3:
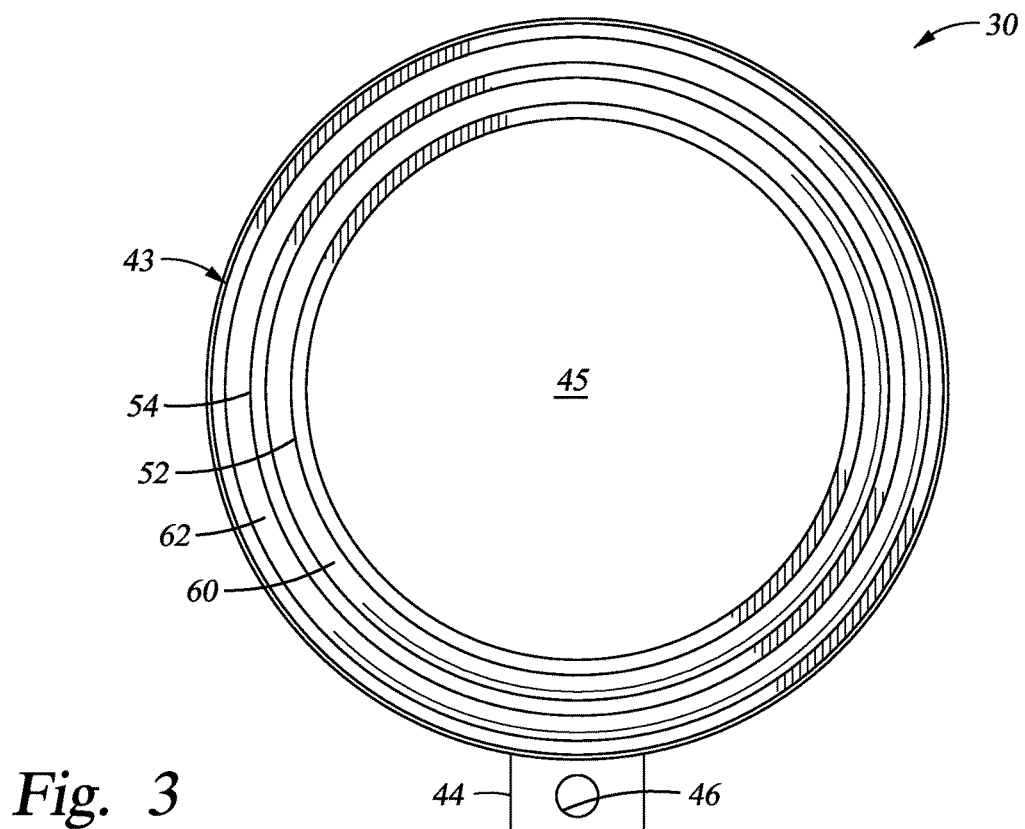
FIG. 3 is a plan view of an example of a blind element for use in the line blind valve assembly of FIG. 1.
Figure 3:
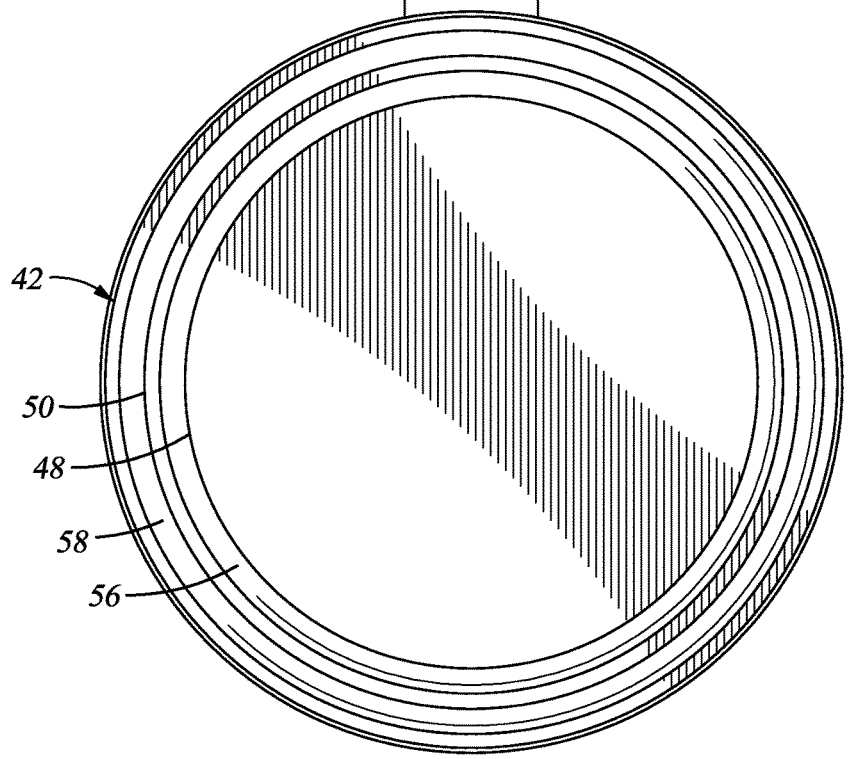

Referring now to FIG. 3, shown is one example of the blind element 30 in a plan view wherein the blind element 30 includes a blind 42 or blank shown as a substantially solid planar member with a disk-like shape and circular outer circumference. A ring spacer 43, also having a generally planar configuration and circular outer shape, is attached to blind 42 by a connector 44. In the example, connector 44 is generally rectangularly shaped. In an embodiment, blind 42, ring spacer 43, and connector 44 are all generally co-planar. A bore 45 extends axially through the mid-portion of ring spacer 43. Accordingly, selectively disposing the ring spacer 43 between flanges 32, 33 instead of blind 42, allows, rather than blocks, fluid communication through line 18 and across flanges 32, 33 and within bore 45. Referring back to FIG. 2, bolt 36 is shown projecting through an opening 46 formed through connector 44. Thus, by loosening nuts 35 and bolts 36 from one another, the blind element 30 can be rotated about bolt 36 and changed from a blocking configuration, as shown in FIG. 2, to an open configuration as shown in FIG. 1, which allows flow through line 18 and into line 22. In the open configuration, fluid can flow through the bore 45 of ring spacer 43 rather than being blocked by the solid blind 42.

Shown in both FIGS. 2 and 3 are inner recesses 48 formed a radial distance into, and along circumferences of planar surfaces of blind 42, where the planar surfaces are on opposite sides of the blind 42. Each inner recess 48 is circumscribed by an outer recess 50 on both planar sides of blind 42, where outer recess 50 is also formed a radial distance into the body of the blind 42. Although shown as having a generally rectangular cross-section, recesses 48, 50 can also have other shapes, such as round or elliptical. Similarly, the solid portion of the ring spacer 43 includes inner recesses 52 each shown circumscribing bore 45, and on planar sides of ring spacer 43 that are on its opposing sides. Each inner recess 52 is circumscribed by an outer recess 54 that also extends a radial distance into ring spacer 43. Inner O-rings 56 are shown set in inner recesses 48, and which provide primary seals between the blind 42 and flanges 32, 33 when blind 42 is mounted within flanges 32, 33. Outer sealant ring 58 are shown set inside of outer recesses 50 and as shown in FIG. 2, provide an outer or redundant sealing interface between blind 42 and flanges 32, 33. Ring spacer 43 includes inner O-rings 60 set inside of inner recesses 52 and when ring spacer 43 is set within flanges 32, 33 a primary sealing interface between ring spacer 43 and flanges 32, 33 is provided along inner O-rings 60. Outer sealant rings 62 are shown set in outer recesses 54 on both sides of ring spacer 43, and which provide an outer and redundant seal between ring spacer 43 and flanges 32, 33.

Referring back to FIG. 2, an injection system 64 is shown for forming outer sealant rings 58, 62. In an embodiment, outer sealant rings 58, 62 are formed after the blind element 30 has been installed between flanges 32, 33; and which can be done through any mechanical force that relaxes joint tightness. In this example, a sealant source 66 is shown as having a container with sealant 68 disposed therein, and an injection line 70 for transmitting sealant 68 into the outer recesses 50, 54 in order to form the outer sealant rings 58, 62. An end of injection hose 70 distal from sealant source 66 connects to an injection fitting 72 shown mounted on an outer surface of flange 32. A passage 74 is bored through flange 32 from its outer surface and projects radially inward to be in registration with outer recess 50. Accordingly, by forcing (pumping) sealant 68 into injection line 70 and through fitting 72, such as by an injection pump (not shown), sealant 68 makes its way through passage 74 where it is injected into the outer recess 50 and flows circumferentially through recess 50 and to form outer sealant rings 58. In this fashion, a redundant and safety backup seal can be formed along blind element 30 after blind element 30 has been installed. In one example, the secondary seal is formed after detection of a leak through the line blind valve assembly 21. Similarly, an injection fitting 76 is mounted onto an outer surface of flange 33 and which allows for communication of sealant 68 into a passage 78, shown projecting through flange 33 and into registration with outer recess 50 adjacent flange 33. In a similar fashion, injecting sealant 68 through fitting 76 and passage 78 forms a redundant seal and outer sealant ring 58 on a surface of blind 42 facing flange 33. For purposes of clarity, although ring spacer 43 of FIG. 2 is shown set outside of flanges 32, 33 and outer sealant ring 62 is illustrated set within outer recess 54. Examples exist wherein formation of outer seal ring 62 is formed in much the same way as outer seal ring 58 as described above.

Figure 4:
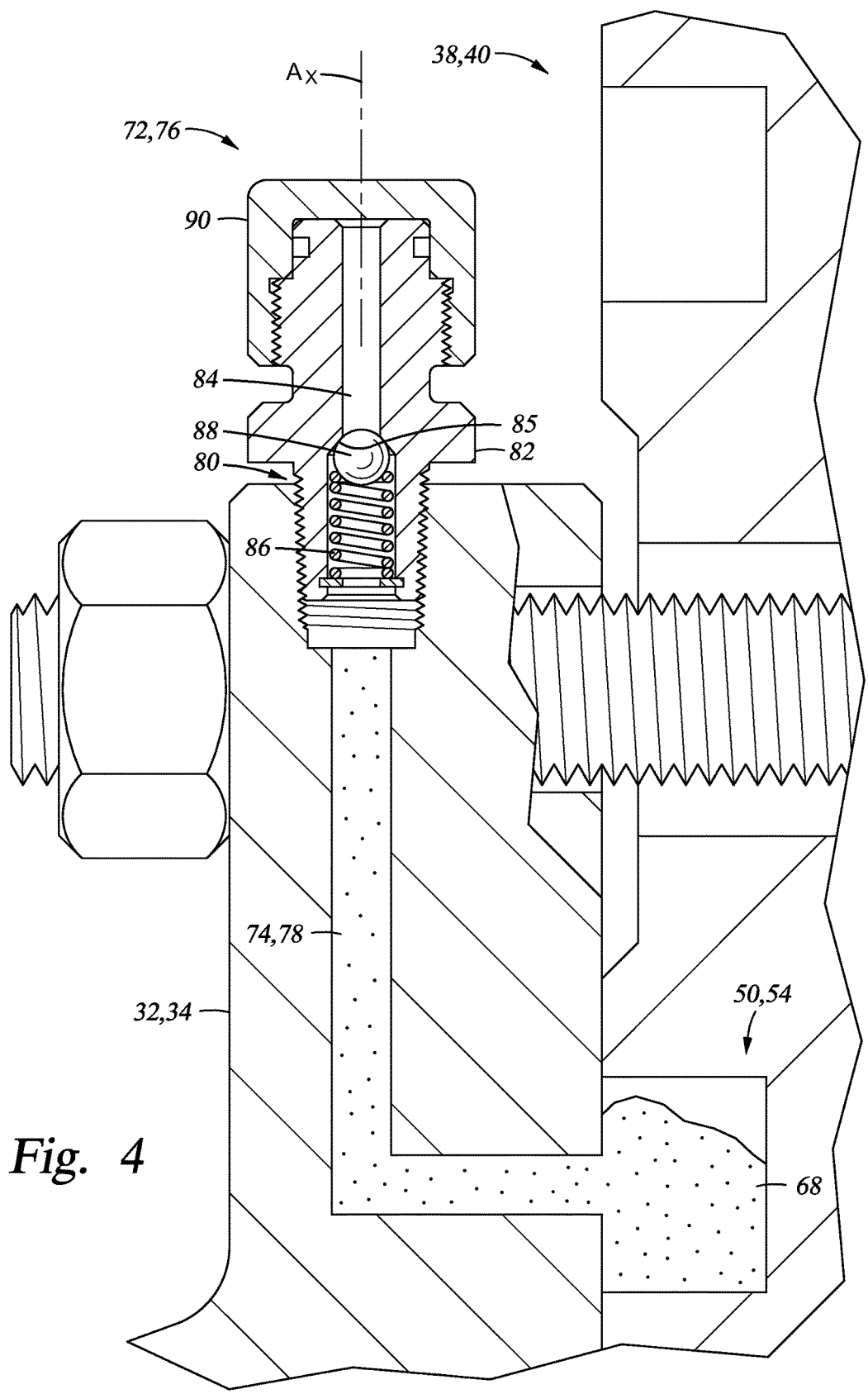
FIG. 4 is a side sectional view of an embodiment of an injection fitting for use with the line blind valve assembly of FIG. 1.

FIG. 4 shows in a side sectional view one example of injection fittings 72, 76. Here, a tap 80 is shown drilled into the outer surface of flanges 32, 33 and which may be threaded so that fittings 72, 76 may be threadingly attached to flanges 32, 33. Fittings 72, 76 are shown made up of a generally elongate body 82 having threads on its lower end as described above and a bore 84 formed through an axis $A_X$ of the body 82. Bore 84 enlarges at roughly a midpoint of body 82 to form a downward facing shoulder 85. A spring 86 is shown set within the enlarged portion of bore 84 and below shoulder 85. A ball check 88 is depicted on top of spring 86 and being urged by the spring 86 against the shoulder 85. The combination of the spring 86 and ball check 88 forms a check valve which prevents egress of fluid within passage 74, 78 from escaping from fitting 72, 76 through bore 84. By applying sealant 68 at a pressure that exerts a force onto ball check 88, which exceeds the strength of string 86, can force ball check 88 downward to compress spring 86, thereby allowing sealant 68 to flow through bore 84 and past ball 88 and spring 86, and through passages 74, 78 for creation of sealant rings 58, 62 (FIG. 2) within recesses 50, 54. In the example of FIG. 4, sealant 68 is shown in recesses 50, 54 and prior to being cured or otherwise transitioned from a flowable substance to the pressure resistant material that makes up the sealant rings 58, 62. Curing of the sealant 68 to form the sealant rings 58, 62 can take place at ambient conditions over time, or with the addition of heat. Further included with the fittings 72, 76 is a cap 90 for covering the bore 84 and further preventing egress of sealant 68, or other fluid, from exiting bore 84.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. Optional embodiments exist where one or both of flanges 32, 33 are axially retractable so that loosening of the fasteners 34 is unnecessary for moving the blind element 30 between its open and closed configurations. For example, a cam (not shown) can be used to move one of the flanges 32, 33 along an axis $A_X$ of the passage P. These and other similar modifications will readily suggest themselves to those skilled in the art, and are intended to be encompassed within the spirit of the present invention disclosed herein and the scope of the appended claims.

What is claimed is:

1. A blind valve assembly for use in a fluids handling circuit comprising: a flange connected to a tubular in the fluids handling circuit, and that is intersected by a flow path within the tubular; a blind element comprising a planar surface in communication with an inside of the tubular and that has an outer periphery in sealing contact with the flange to define a sealing interface; a seal provided along the circumference of the sealing interface and that defines a pressure barrier along a radial path; a recess on the planar surface along the sealing interface and that circumscribes the seal and the flow path; and a sealant injection system comprising a sealant passage extending through the flange and having an end in communication with the recess, so that when sealant is injected into the recess-the sealant flows within the recess circumscribing the flow path and seal while the recess completely surrounds an axis of the flow path to form a sealant ring that is redundant to the seal.

2. The blind valve assembly of claim 1, further comprising a sealant fitting inserted into an end of the passage distal from the recess, the sealant fitting comprising a body, a bore formed through the body that transitions radially inward to define a shoulder, a ball in the bore that selectively seats in the shoulder, and a spring biasing the ball against the shoulder.

3. The blind valve assembly of claim 1, further comprising a sealant source in communication with the sealant injection system.

4. The blind valve assembly of claim 1, wherein the recess has a generally rectangular cross section.

5. The blind valve assembly of claim 1, wherein the blind element comprises a spectacle blind, having a substantially disk like planar blank portion, and a planar ring like spectacle portion that is coplanar and attached to the blank portion, and wherein both the blank portion and spectacle portion each have a sealing interface in selective sealing contact with the flange.

6. The blind valve assembly of claim 1, wherein the planar surface comprises a first surface and wherein the flange comprises a first flange, the blind element further comprising a second surface that is on a side opposite the first surface and that is in sealing contact with a second flange that is coupled to the first flange.

7. The blind valve assembly of claim 1, wherein the tubular comprises a fluids handling element selected from the group consisting of a fluid flow line.

8. The blind valve assembly of claim 1, wherein the seal comprises an O-ring seal.

9. A fluids handling circuit comprising: a tubular having a flow path; a flange mounted to an end of the tubular; a blind element comprising a planar surface having an inner radial portion that is in communication with an inside of the tubular and that has an outer radial portion in sealing contact with the flange to define a sealing interface; a seal element disposed along the sealing interface and that circumscribes the inner portion and that defines an inner seal; a recess formed in one of the flange or the outer portion that circumscribes the seal element and the flow path, and that is spaced radially outward from the seal element; and a passage formed axially and radially through the flange having an end in communication with the recess and an opposite end in selective communication with a source of sealant, so that when sealant is provided by the source of sealant to the passage while the recess completely surrounds an axis of the flow path, a redundant seal is formed along the recess that defines an outer seal to block pressure communication along a radial path between the blind element and flange.

10. The fluids handling circuit of claim 9, further comprising a sealant injection system for injecting sealant from the source of sealant into the passage.

11. The fluids handling circuit of claim 10, further comprising a fitting at an end of the passage on which an injection line that is part of the sealant injection system is attached.

12. The fluids handling circuit of claim 9, wherein the tubular comprises a fluids handling element selected from the group consisting of a fluid flow line and a nipple that attaches to a vessel.

13. The fluids handling circuit of claim 9, wherein the blind element further comprises a spectacle blind portion that is planar and has a mid-portion with an opening through the mid-portion, and an outer portion that circumscribes the mid-portion and that is in selective sealing contact with the flange to define a sealing interface.

14. The fluids handling circuit of claim 9, wherein the planar surface comprises a first surface, the flange comprises a first flange, the seal element comprises a first seal element, the redundant seal comprises a first redundant seal, and wherein the blind element comprises a second planar surface that is on a side opposite the first surface, and that is in sealing contact with a second flange by a second seal element that is circumscribed by a second redundant seal that comprises sealant selectively disposed in a recess formed on the second planar surface.

15. A method of forming a blind in a fluids handling circuit comprising: providing a blind element that comprises a blank section having a planar surface with a seal element and a groove that circumscribes the seal element, and a ring spacer section having a planar surface with a seal element and a groove that circumscribes the seal element; mounting the blind element to a flange that connects to an end of a fluids handling tubular so that the seal element in the blank section is in sealing contact with the flange to define a sealing interface; providing a flow path in the tubular; injecting a sealant into the groove in the blank section while the groove in the blank section completely surrounds an axis of the flow path to form a redundant seal that circumscribes the fluids handling tubular and blocks pressure communication along a radial path between the flange and the blank section; rotating the blind element so that the ring spacer section is in sealing contact with the flange to define another sealing interface; and injecting a sealant into the groove in the ring spacer section while the groove in the ring spacer section completely surrounds the axis of the flow path to form another redundant seal that circumscribes the fluids handling tubular and blocks pressure communication along a radial path between the flange and the ring spacer section.

16. The method of claim 15, wherein a passage is formed through the flange.

17. The method of claim 16, wherein a sealant injection system connects to the passage and injects sealant into the passage.

18. The method of claim 15, wherein planar surface comprises a first surface and the flange comprises a first flange, the blind element has a second surface that is planar and opposite the first surface, the method further comprising mounting the blind element to a second flange, so that the second surface is in sealing contact with the second flange.

19. The method of claim 18, wherein the groove comprises a first groove, the redundant seal comprises a first redundant seal, the seal element comprises a second seal element, and wherein the second surface comprises a second groove in which sealant is injected to form a second redundant seal that circumscribes the second seal element.

20. The method of claim 18, wherein the fluids handling tubular comprises an element selected from the group consisting of a fluid flow line and a nipple that attaches to a vessel.

* * * * *